US012512038B2

(12) United States Patent
Sasaki

(10) Patent No.: US 12,512,038 B2
(45) Date of Patent: Dec. 30, 2025

(54) DISPLAY APPARATUS

(71) Applicant: Sharp Display Technology Corporation, Mie (JP)

(72) Inventor: Taichi Sasaki, Mie (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/757,584

(22) Filed: Jun. 28, 2024

(65) Prior Publication Data

US 2025/0054433 A1 Feb. 13, 2025

(30) Foreign Application Priority Data

Aug. 8, 2023 (JP) ................................. 2023-129511

(51) Int. Cl.
*G09G 3/20* (2006.01)

(52) U.S. Cl.
CPC ... *G09G 3/2092* (2013.01); *G09G 2320/0247* (2013.01); *G09G 2330/023* (2013.01)

(58) Field of Classification Search
CPC ......... G09G 3/2092; G09G 2320/0247; G09G 2330/023; G09G 3/3614; G09G 3/3648
See application file for complete search history.

(56) References Cited

U.S. PATENT DOCUMENTS

2006/0274011 A1* 12/2006 Igarashi ............... G09G 3/3655 345/94
2014/0225881 A1* 8/2014 Takahashi ............ G09G 3/3614 345/209
2015/0062100 A1 3/2015 Tanaka et al.
2016/0005368 A1* 1/2016 Park .................... G02F 1/13306 345/209
2017/0309237 A1* 10/2017 Lee ...................... G09G 3/3648
2018/0130433 A1* 5/2018 Sato ..................... G09G 3/3618
2019/0139503 A1* 5/2019 Chen ..................... G02F 1/1345
2019/0310502 A1* 10/2019 Chida ................... G02F 1/1368
2020/0090596 A1* 3/2020 Oh ........................ G09G 3/3406
2020/0211471 A1* 7/2020 Park ..................... G09G 3/3233
2020/0226980 A1* 7/2020 Park ..................... G09G 3/3233
2022/0114956 A1* 4/2022 Lee .......................... G09G 5/00
2024/0038154 A1* 2/2024 Ryu ...................... G09G 3/3233
2024/0274060 A1* 8/2024 Kim ...................... G09G 3/3275

FOREIGN PATENT DOCUMENTS

JP 2001-312253 A 11/2001
JP 2015-052632 A 3/2015
WO 2013/115088 A1 8/2013
WO 2018/116939 A1 6/2018

* cited by examiner

*Primary Examiner* — Jose R Soto Lopez
(74) *Attorney, Agent, or Firm* — ScienBiziP, P.C.

(57) ABSTRACT

A display apparatus includes a signal driving circuit and a display control circuit. When a refresh rate is changed from a first frequency to a second frequency higher than the first frequency, the display control circuit sets a third time period between a first time period having the refresh rate at the first frequency and a second time period having the refresh rate at the second frequency. The display control circuit rewrites for the third time period an image to be displayed on a display panel by alternating the polarity of a pixel voltage between a positive polarity and a negative polarity at a third frequency higher than the second frequency.

3 Claims, 9 Drawing Sheets

DISPLAY APPARATUS

BACKGROUND

1. Field

The present disclosure relates to a display apparatus.

2. Description of the Related Art

The display apparatus disclosed in International Publication No. WO2013/115088 is configured such that a frequency as a refresh rate used to rewrite (refresh) a screen of a display is changeable. The display apparatus is transitioned from a standard period of standard driving to a pause period of paused driving lower in refresh rate than the standard driving. In the display apparatus, a transitional period is set between the standard period and the pause period and the screen of the display is refreshed for the transitional period at a refresh rate that is between a refresh rate of the standard driving and a refresh rate of the paused driving. In the display apparatus, the transitional period is also set between the pause period and the standard period when the pause period transitions to the standard period. A period of refreshing at a positive polarity and a period of refreshing at a negative polarity are arranged each of the standard period, the pause period and the transitional period. The ratio of the period of refreshing at the positive polarity to the transitional period is equal to the ratio of the period of refreshing at the negative polarity to the transitional period.

The refresh rate in the pause period is lower in the display apparatus disclosed in International Publication No. WO2013/115088. The display apparatus, if switched to the transitional period at any timing during the pause period, transitions to the transitional period with the display charged with a positive polarity or a negative polarity (with the polarity of charges biased and this is hereinafter referred to as bias of charges). During the transitional period after the transition, refreshing with the positive polarity and refreshing with the negative polarity are performed with the bias of charges. As a result, a difference occurs between an operation voltage resulting from refreshing with the positive polarity and an operation voltage resulting from refreshing with the negative polarity. If the refreshing with the positive polarity and the refreshing with the negative polarity are alternately performed, a luminance difference increases during a time duration (at a frequency half as high as the refresh rate) between two frame periods, possibly causing flickering (half flickering) to be visible.

It is desirable to provide a display apparatus that controls flicker visibility even when a refresh rate is transitioned from a low value to a high value.

SUMMARY

According to an aspect of the disclosure, there is provided a display apparatus including: a display panel displaying an image and including a pixel electrode and a common electrode that forms a electric field between the pixel electrode and the common electrode; a driving circuit that supplies the pixel electrode with a pixel voltage; and a control circuit that controls a refresh rate that is a frequency at which the driving circuit supplies the pixel electrode with the pixel voltage and at which the image to be displayed on the display panel is rewritten, wherein the control circuit, when changing the refresh rate from a first frequency to a second frequency higher than the first frequency, sets a third time period between a first time period used to rewrite at the first frequency the image to be displayed on the display panel and a second time period used to rewrite at the second frequency the image to be displayed on the display panel and rewrites the image on the display panel by alternately supplying at a third frequency for the third time period the pixel electrode with the pixel voltage having a positive polarity with respect to a common voltage supplied to the common electrode and the pixel voltage having a negative polarity with respect to the common voltage supplied to the common electrode, wherein the third frequency is higher than the second frequency and is 60 Hz or higher if the second frequency is lower than 20 Hz.

DESCRIPTION OF THE EMBODIMENTS

Figure 1:
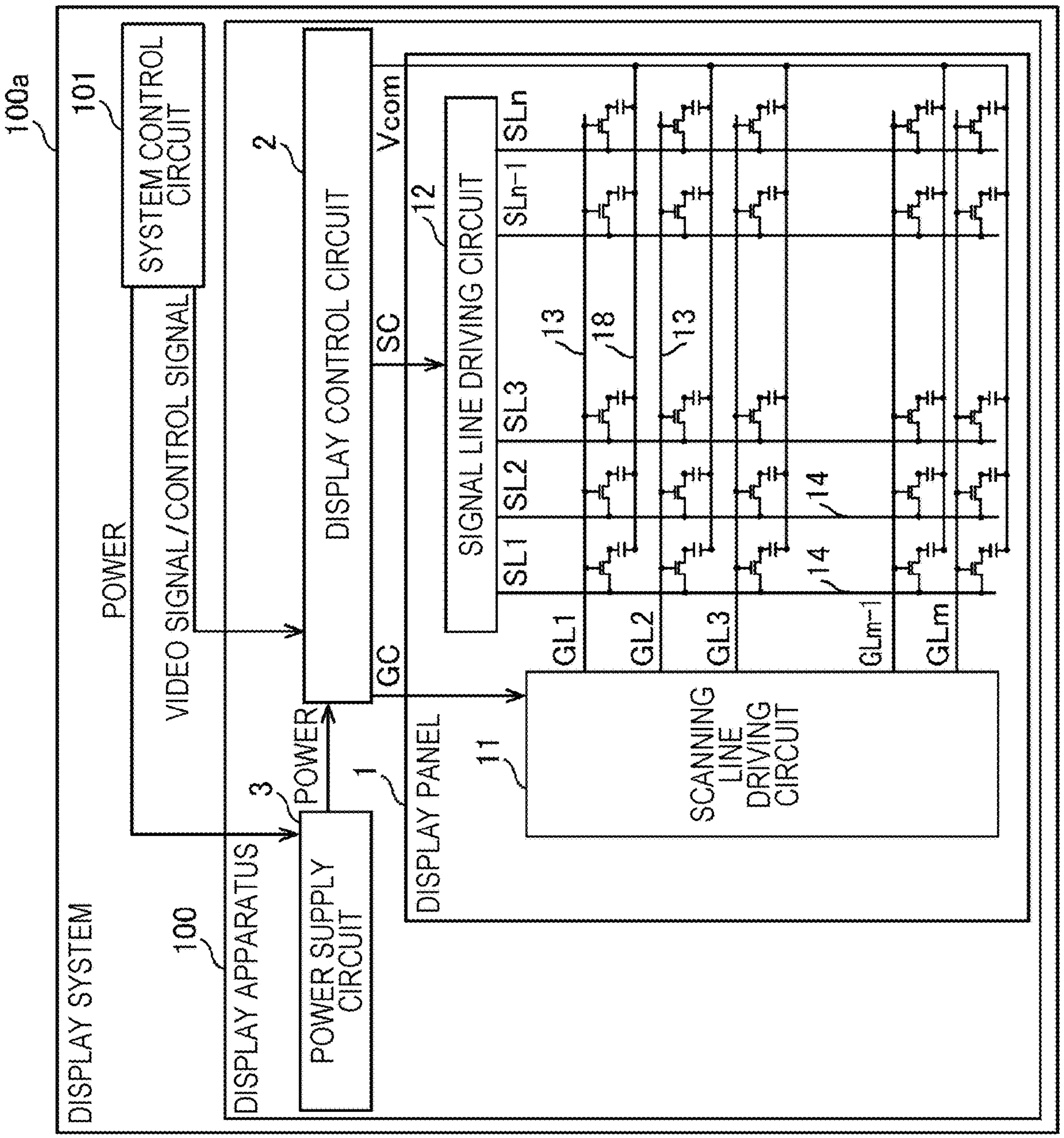
FIG. 1 is a block diagram illustrating a configuration of a display system including a display apparatus according to an embodiment.

Embodiment of the disclosure is described with reference to the drawings. The disclosure is not limited to the embodiment described below. The embodiment may be appropriately modified without departing from the scope of the disclosure. In the discussion that follows, like elements or elements having the same function are designated with the same reference numerals throughout different drawings and the discussion thereof are not repeated. Configurations in the embodiment and modifications of the embodiment may be combined or changed without departing from the scope of the disclosure. For easier understanding, the configurations may be simplified or clarified in the drawings, and some of components in each configuration may be omitted from the drawings.

Whole Configuration of Display Apparatus

FIG. 1 is a block diagram illustrating a configuration of a display system 100*a* including a display apparatus 100 according to an embodiment. As illustrated in FIG. 1, the display system 100*a* includes the display apparatus 100 and system control circuit 101. The system control circuit 101 is a host controller. The system control circuit 101 supplies the display apparatus 100 with not only power but also a video signal and a control signal. The display apparatus 100 display a video in response to the video signal. The video signal includes information on pixel values (tone) of each of red (R), green (G) and blue (B) colors. The clock signal includes a signal that commands a display panel 1 to be driven in a standard mode or a low-frequency mode. The display apparatus 100 may be a display monitor, a personal computer, a tablet terminal, a smart phone, a smart watch or a television device. The display apparatus 100 may also be a liquid-crystal display, a micro light-emitting diode (LED) display or an organic electroluminescent (EL) display. The system control circuit 101 may be integrated with the display apparatus 100 as a unitary body or may be external to the display apparatus 100. The display apparatus 100 may employ any of the driving systems including a fringe-field switching (FFS) system, an in-plane switching (IPS) system, a twisted-nematic (TN) system and a vertical alignment (VA) system.

The standard mode refers to the state in which the display apparatus 100 displays a video to a user. In the embodiment, the refresh rate is 60 Hz (R2) in the standard mode. The low-frequency mode refers to the state in which the refresh rate is set to be lower than a frequency in the standard mode. The display apparatus 100 operates in the low-frequency mode when the display apparatus 100 displays a still image or when the display apparatus 100 is unable to detect a user (for example, when no input is made by the user for a specific period of time or when no user is present within the scope of a camera (not illustrated) of the display system 100*a*). The refresh rate refers to a frequency at which a pixel voltage Vp (see FIG. 3) is supplied to the pixel electrode 16 (see FIG. 2) and an image to be displayed on the display panel 1 is rewritten. Lowering the refresh rate may reduce the number of image rewrite operations and power consumption. According to the embodiment, the refresh rate in the low-frequency mode is set to 1 Hz (R1).

Referring to FIG. 1, the display apparatus 100 includes a display panel 1, a display control circuit 2 and a power supply circuit 3. The display panel 1, powered by the power supply circuit 3, displays a video in response to a command from the display control circuit 2. The display control circuit 2 includes a processor (integrated circuit) that performs each control operation of the display apparatus 100. The display control circuit 2 receives a video signal and a control signal from the system control circuit 101 and then generates a gate control signal GC and a source control signal SC. The display control circuit 2 supplies a common electrode 17 described below (see FIG. 2) with a common voltage Vcom. The power supply circuit 3 converts a voltage of power supplied by the system control circuit 101 into a voltage suitable for the display control circuit 2 and supplies the display control circuit 2 with the power as a result of conversion.

Figure 2:
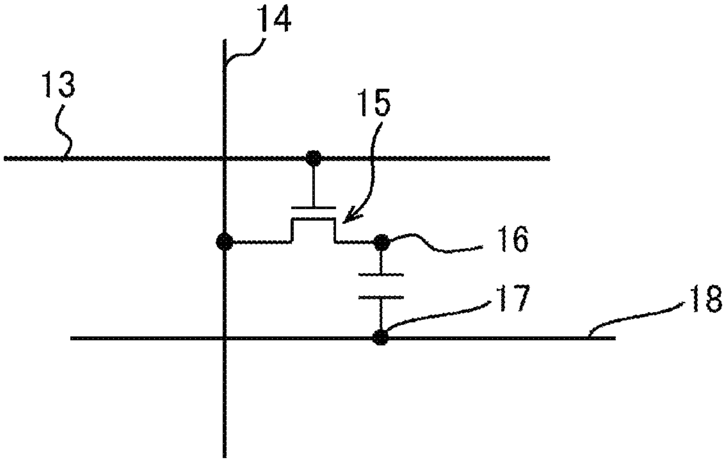
FIG. 2 is a circuit diagram illustrating a configuration of a pixel.

The display panel 1 includes a scanning line driving circuit 11, a signal line driving circuit 12, multiple gate lines 13 and multiple source lines 14. The number of gate lines 13 is a natural number m. The number of source lines 14 is a natural number n. The gate lines 13 intersect the source lines 14. Referring to FIG. 2, a thin-film transistor 15 and a pixel electrode 16 are arranged in each of regions (pixels) defined by the gate lines 13 and the source lines 14. The gate line 13 is connected to the gate electrode of the thin-film transistor 15. The source line 14 is connected to the source electrode of the thin-film transistor 15. The pixel electrode 16 is connected to the drain electrode of the thin-film transistor 15. The display panel 1 includes a common electrode 17 that forms an electric field with the pixel electrode 16. The common electrode 17 corresponds to (is commonly arranged for) multiple pixel electrodes 16. The display panel 1 includes a common wiring 18 that connects the common electrode 17 to the display control circuit 2.

The scanning line driving circuit 11 supplies the m gate lines 13 with a gate signal successively (in the order of GL1, GL2, GL3, . . . , GLm−1, and GLm) during one frame period. The one frame period is synchronized with (is matched to) a time duration while a vertical synchronization signal is output by the display control circuit 2. The signal line driving circuit 12 supplies each of the n source lines 14 with the source signal. The signal line driving circuit 12 reverses every frame period the polarity of the source signal to be supplied to the source line 14. For example, the signal line driving circuit 12 sets to be positive the polarity of the source signal to be supplied to the odd-numbered source lines (SL1, SL3, . . . ) of the n source lines 14 while setting to be negative the polarity of the source signal to be supplied to the even-numbered source lines (SL2, SL4, . . . ). For the next frame period, the signal line driving circuit 12 sets to be negative the source signal to be supplied to the odd-numbered source lines 14 while setting to be positive the source signal to be supplied to the even-numbered source lines 14. According to the disclosure, the "polarity" refers to the polarity of a voltage (either a positive polarity or a negative polarity) with respect to the common voltage Vcom (see FIG. 3).

Figure 3:
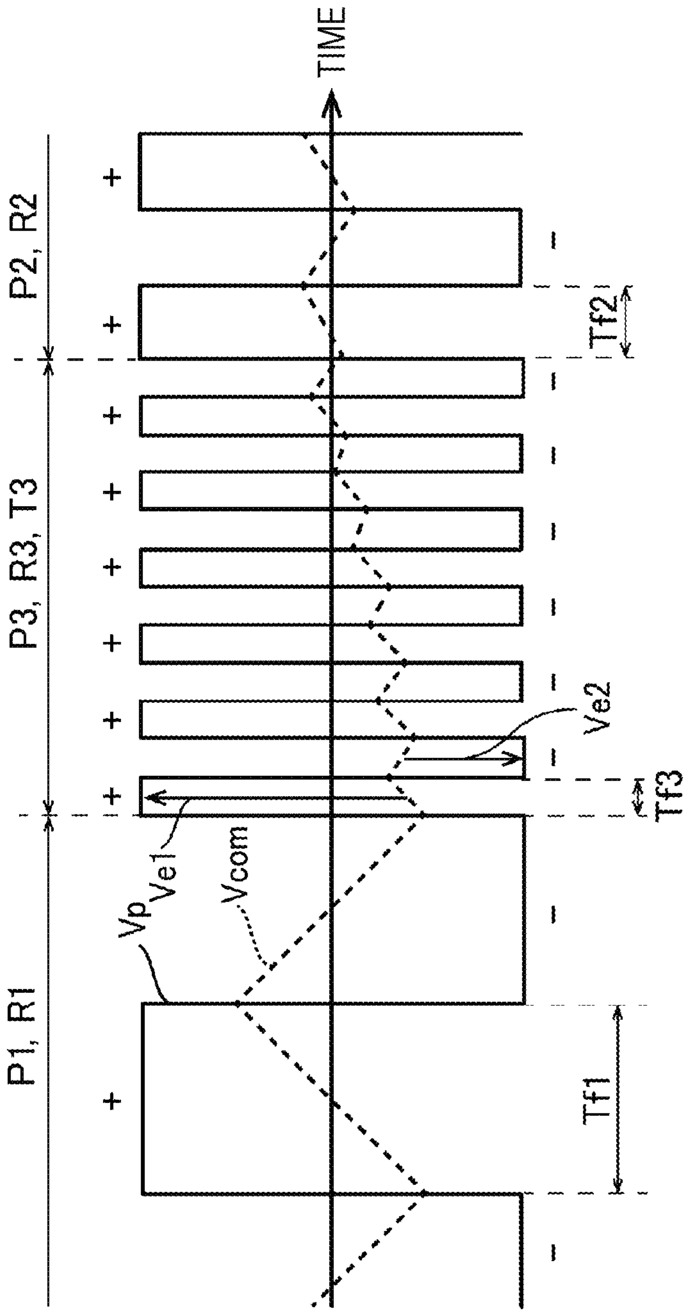
FIG. 3 illustrating a relationship between a common voltage and a pixel voltage.

FIG. 3 illustrating the relationship between the common voltage Vcom and pixel voltage Vp. When the gate electrode of the thin-film transistor 15 is supplied with the gate signal, the source signal supplied to the source electrode of the thin-film transistor 15 is supplied to the pixel electrode 16 via the drain electrode of the thin-film transistor 15. As illustrated in FIG. 3, the polarity of the pixel voltage Vp serving as a voltage to be supplied to the pixel electrode 16 is reversed every frame period (Tf1, Tf2 or Tf3). Referring to FIG. 3, the positive polarity is denoted by "+," and the negative polarity is denoted by "−."

The display control circuit 2 controls the refresh rate as illustrated in FIG. 3. In response to the reception of the control signal used to transition from the low-frequency mode to the standard mode from the system control circuit 101 in the embodiment, the display control circuit 2 inserts a third time period P3 serving as a transitional period between a first time period P1 with the display panel 1 operating in the low-frequency mode (with a refresh rate R1) and a second time period P2 with the display panel 1 operating in the standard mode (with a refresh rate R2). For the third time period P3, the display control circuit 2 rewrites the image to be displayed on the display panel 1 by alternating the polarity of the pixel voltage Vp between the positive polarity "+" and the negative polarity "−" at a refresh rate R3 that is higher in frequency than the refresh rate R2 of the second time period P2. According to the embodiment, the refresh rate R3 is 120 Hz.

The display control circuit 2 supplies the common voltage Vcom to the common electrode 17 via the common wiring 18. The common electrode 17 supplied with the pixel voltage Vp stores charges of the polarity of the pixel voltage Vp. In this way, the common voltage Vcom of the common electrode 17 varies (leading to the bias of charges) as illustrated in FIG. 3. An amount of variation in the common voltage Vcom of the common electrode 17 becomes larger (leasing to a larger bias of charges) as the length of one frame period is longer.

Figure 4:
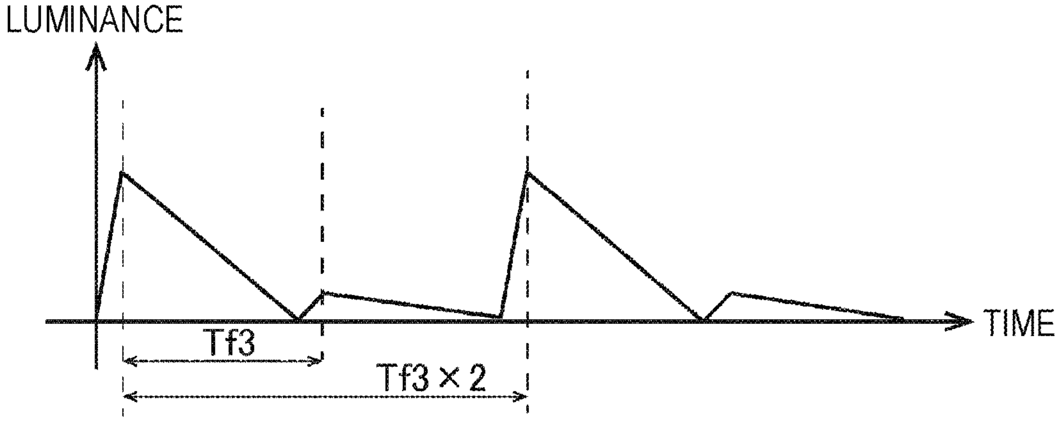
FIG. 4 schematically illustrates a variation in luminance of a third time period.

If the bias of charges caused during the first time period P1 remains in the display panel 1 during the third time period P3 as illustrated in FIG. 3, a difference occurs between an operation voltage Ve1 during the refresh with the positive polarity and an operation voltage Ve2 during the refresh with the negative polarity. As a result, luminance varies with a period twice as long as a frame period Tf2 of the third time period P3 (at a frequency half as high as the frequency of the refresh rate R3) as illustrated in FIG. 4.

Figure 5:
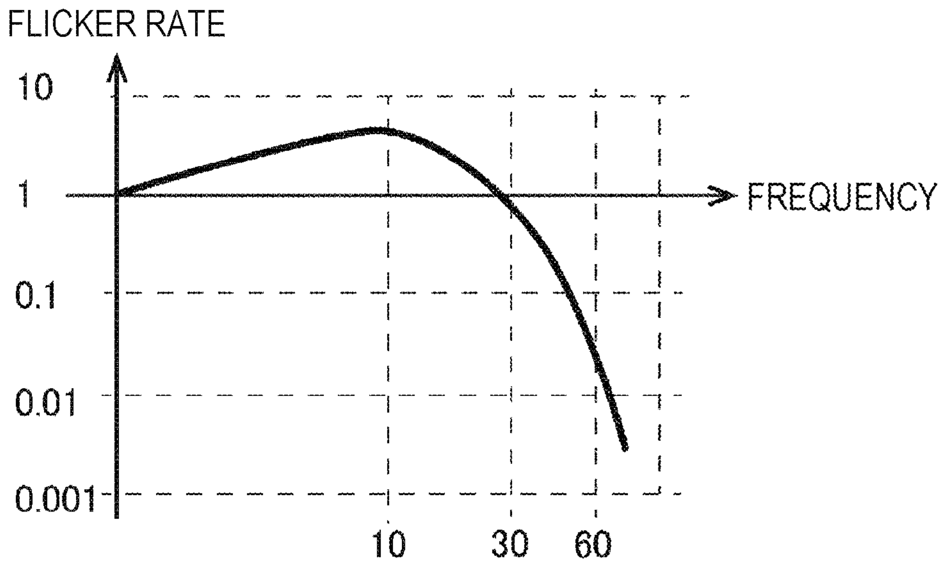
FIG. 5 illustrates a relationship between frequency of the variation in luminance (variation in light and darkness) and flicker rate.

FIG. 5 illustrates a relationship between the variation in luminance (variation in light and darkness) and flicker rate. List of errata 1 in International Electrotechnical Commission (IEC) Standard IEC 62341-6-3:2017 may be referenced for the relationship between the variation in light and darkness and the flicker rate. Humans are more likely to visually recognize flickering as the flicker rate is higher and less likely to visually recognize flickering as the flicker rate is lower.

Half the frequency of the refresh rate R3 (120 Hz) is 60 Hz and the flicker rate is lower (as low as at a level at which humans have difficulty visually recognizing flickering). According to the embodiment, when the first time period P1 with a refresh rate R1 having a higher level transitions to a second time period P2 with the refresh rate R2 having a lower level, the third time period P3 with the refresh rate R3 higher than the refresh rate R2 is inserted between the first time period P1 and the second time period P2. In this way, even when the bias of charges remains during the third time period P3 in the display panel 1, flicker visibility may be controlled. Since the polarity of the pixel voltage Vp is inverted at a higher frequency during the third time period P3 as illustrated in FIG. 3, the bias of charges in the display panel 1 may be reduced during the third time period P3. As a result, flicker visibility may be controlled during the second time period P2.

The refresh rate R2 is not limited to 60 Hz and the refresh rate R3 is not limited to 120 Hz. As illustrated in FIG. 5, if the frequency of luminance variation is 10 Hz or higher, the flicker rate decreases as the frequency increases. For this reason, if the refresh rate R2 is 20 Hz or higher and the refresh rate R3 is higher than 20 Hz, flicker visibility may be controlled in comparison with the case in which the third time period is not implemented.

Figure 6:
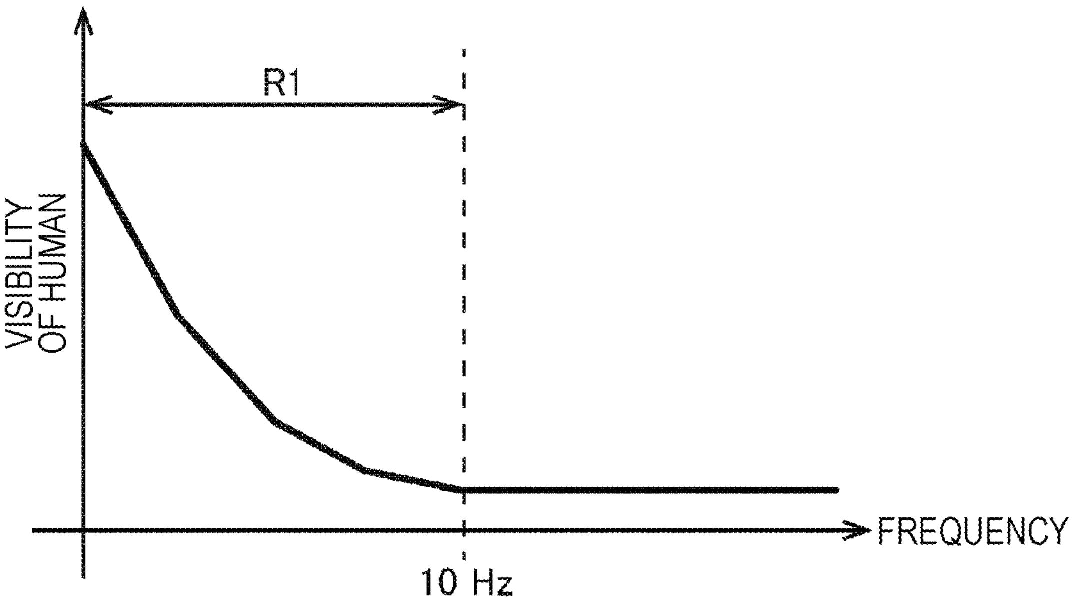
FIG. 6 illustrates a relationship between a refresh rate of a first time period and visibility of human subsequent to the first time period.

FIG. 6 illustrates a relationship between the refresh rate of the first time period P1 and visibility of human subsequent to the first time period P1. The visibility of human refers to the magnitude of flicker felt by the human when the human views the variation in light and darkness for a predetermined period of time. It is noted that as the visibility of human is higher, the flickering felt by human is larger. FIG. 6 illustrates the visibility of human immediately after the first time period P1 transitions to a period of a refresh rate of 60 Hz. Referring to FIG. 6, the visibility of human is higher immediately after the transition to the period of the refresh rate of 60 Hz if the refresh rate of the first time period P1 is 10 Hz or lower. If the refresh rate R1 is 10 Hz or lower, the effect of controlling flicker visibility may be higher with the technique of the disclosure applied (with the third time period implemented).

Figure 7:
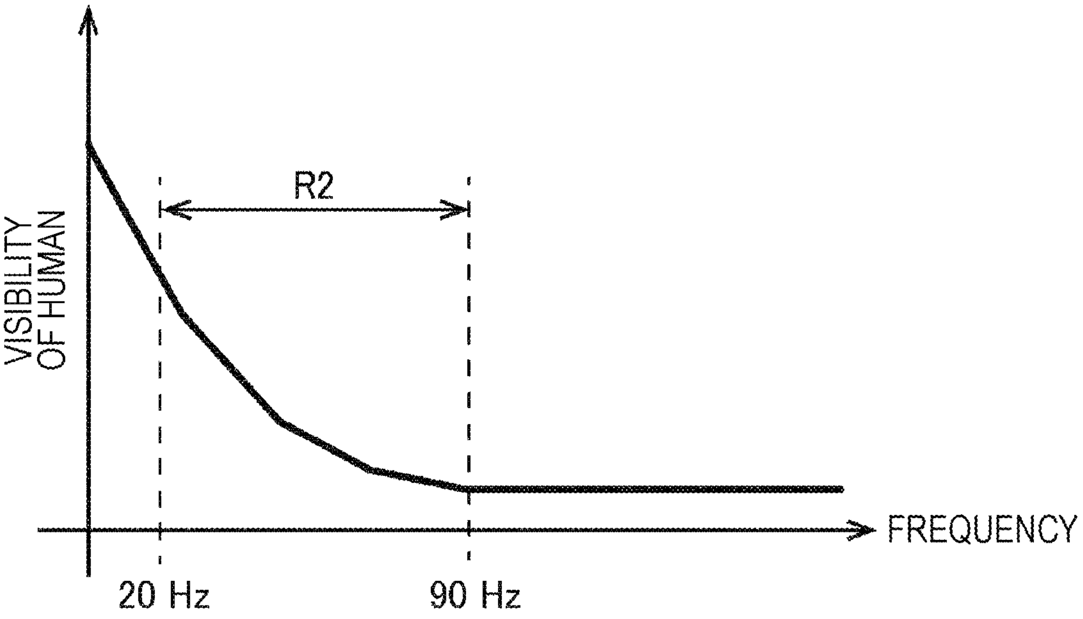
FIG. 7 illustrates a relationship between a refresh rate of a second time period with a third time period not set and visibility of human.

FIG. 7 illustrates a relationship between the refresh rate during the second time period P2 with the third time period P3 not implemented and the visibility of human. With the third time period P3 not implemented as illustrated in FIG. 7, the visibility of human is higher during the second time period P2 if the refresh rate of the second time period P2 is 90 Hz or lower. If the technique of the disclosure is thus applied with the refresh rate R2 being 90 Hz or lower, the effect of controlling flicker visibility of human may be increased.

Figure 8:
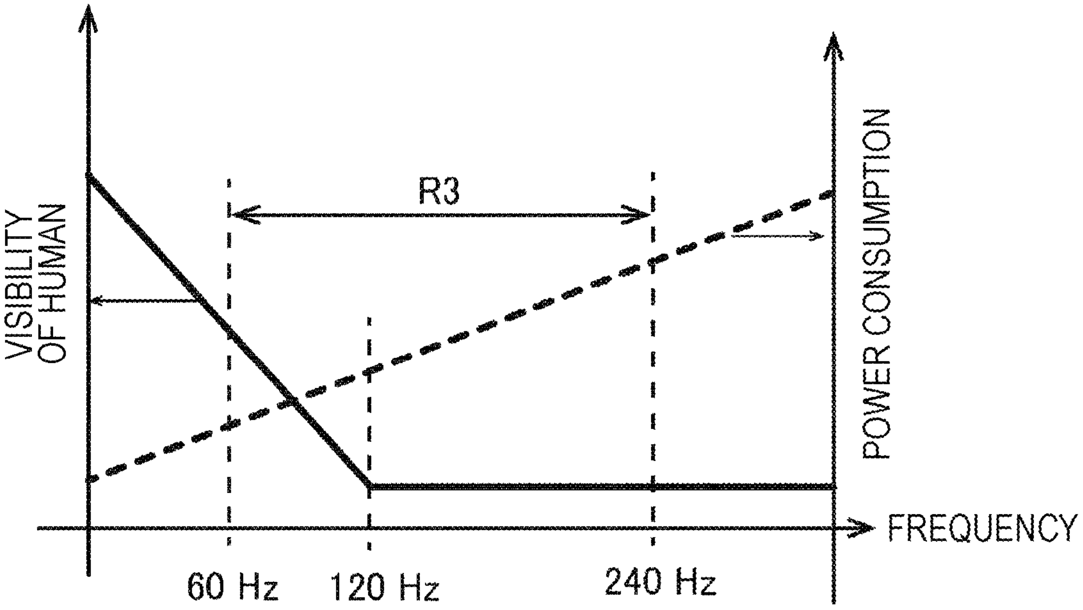
FIG. 8 illustrates a relationship of a refresh rate of the third time period, visibility of human and power consumption.

FIG. 8 illustrates a relationship of the refresh rate of the third time period P3, visibility of human and power consumption. If the frequency of the refresh rate of the third time period P3 is 120 Hz or lower as illustrated in FIG. 8, the visibility of human decreases as the refresh rate is higher. On the other hand, if the frequency of the refresh rate of the third time period P3 is higher than 120 Hz, the visibility of human remains unchanged regardless of the refresh rate. It is noted that even when the frequency of the refresh rate of the third time period P3 is higher than 120 Hz, the flicker rate decreases as the refresh rate is higher.

The power consumption increases as the refresh rate of the third time period P3 is higher. As a result, if the frequency of the refresh rate R3 of the third time period P3 is higher than 60 Hz with the refresh rate R2 being 60 Hz, the flicker visibility may be controlled in comparison with the case in which the third time period P3 is not implemented. If the refresh rate R3 of the third time period P3 is 120 Hz or higher and 240 Hz or lower, the visibility of human may be lowered (to the lowest level) with the power consumption reduced. If the refresh rate R3 of the third time period P3 is 120 Hz, the visibility of human may be lowered (to the lowest level) with the power consumption minimized.

Figure 9:
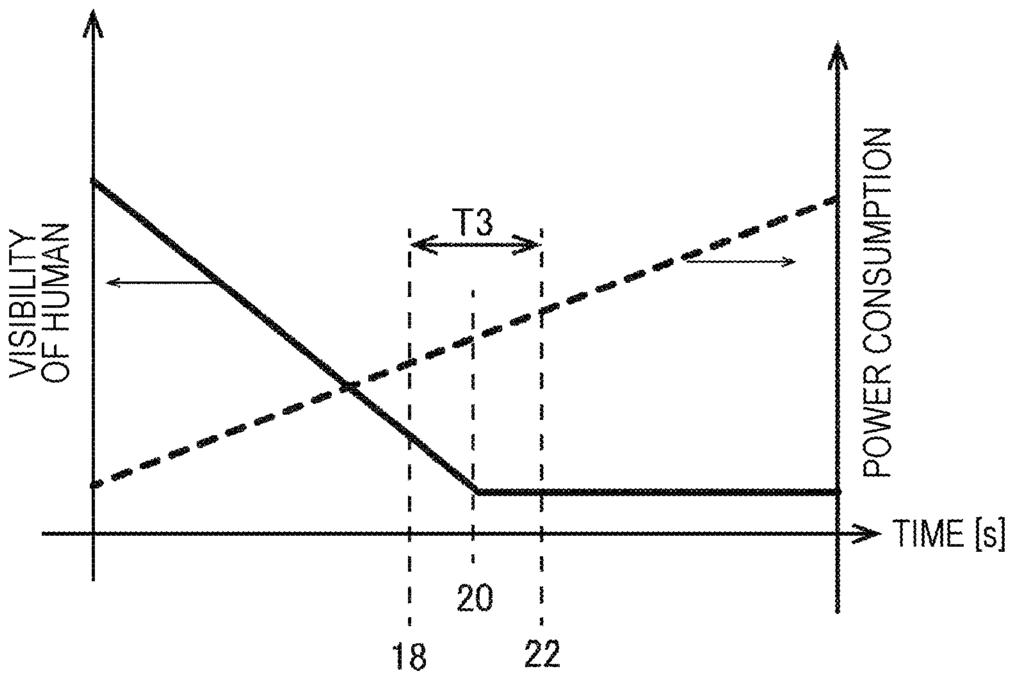
FIG. 9 illustrates a relationship of the length of the third time period, visibility of human and power consumption.

FIG. 9 illustrates a relationship of the length of the third time period P3, visibility of human and power consumption. FIG. 9 thus illustrates the visibility of human at the start of the second time period P2 and the power consumption during the third time period P3 when the refresh rate R3 of the third time period P3 is 120 Hz, the refresh rate R2 of the second time period P2 is 60 Hz and the refresh rate R1 of the first time period P1 is 1 Hz. Referring to FIG. 9, the visibility of human may be reduced (to the lowest level) if the length T3 of the third time period P3 is 20 seconds or longer. If the length T3 of the third time period P3 is 18 seconds or longer and 22 seconds or shorter, the flicker rate may be reduced with the power consumption reduced. If the length T3 of the third time period P3 is 20 seconds, the power consumption is minimized with the flicker rate reduced (to the lowest level).

Figure 10:
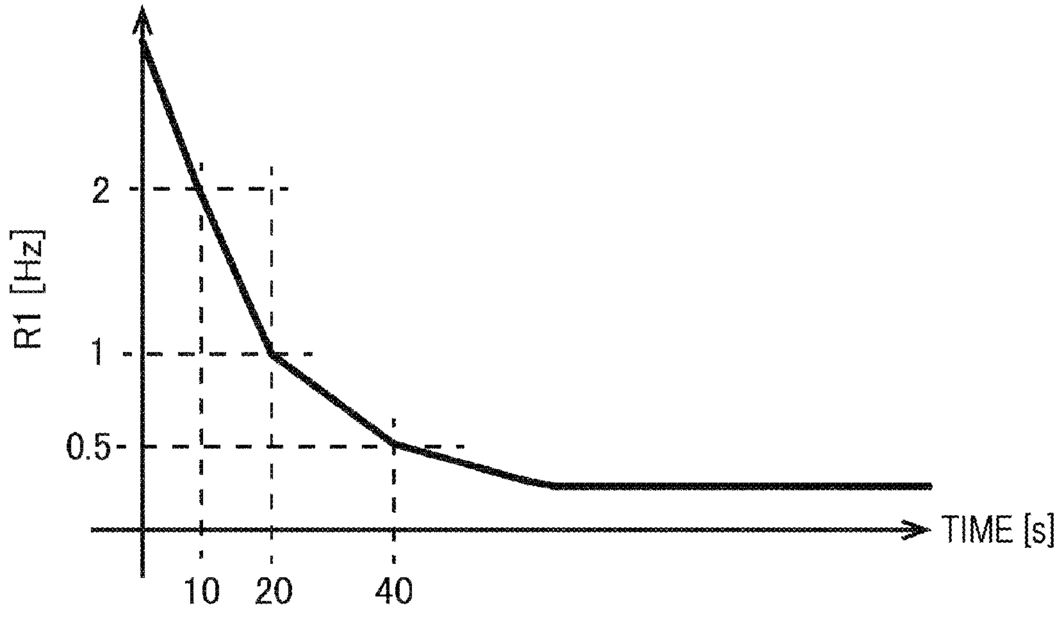
FIG. 10 illustrates a relationship between the refresh rate of the first time period and the sufficient length of the third time period.

FIG. 10 illustrates a relationship between the refresh rate R1 of the first time period P1 and the sufficient length of the third time period P3. The sufficient length of the third time period P3 signifies the length T3 of the third time period P3 that may reduce the visibility of human (to the lowest level) while minimizing the power consumption. Referring to FIG. 9, the sufficient length of the third time period P3 is 20 seconds in FIG. 9. Referring to FIG. 10, the sufficient length of the third time period P3 is shorter as the refresh rate R1 of the first time period P1 is higher. For example, the sufficient length of the third time period P3 is a length that is obtained by dividing 20 seconds by the refresh rate R1.

Figure 11:
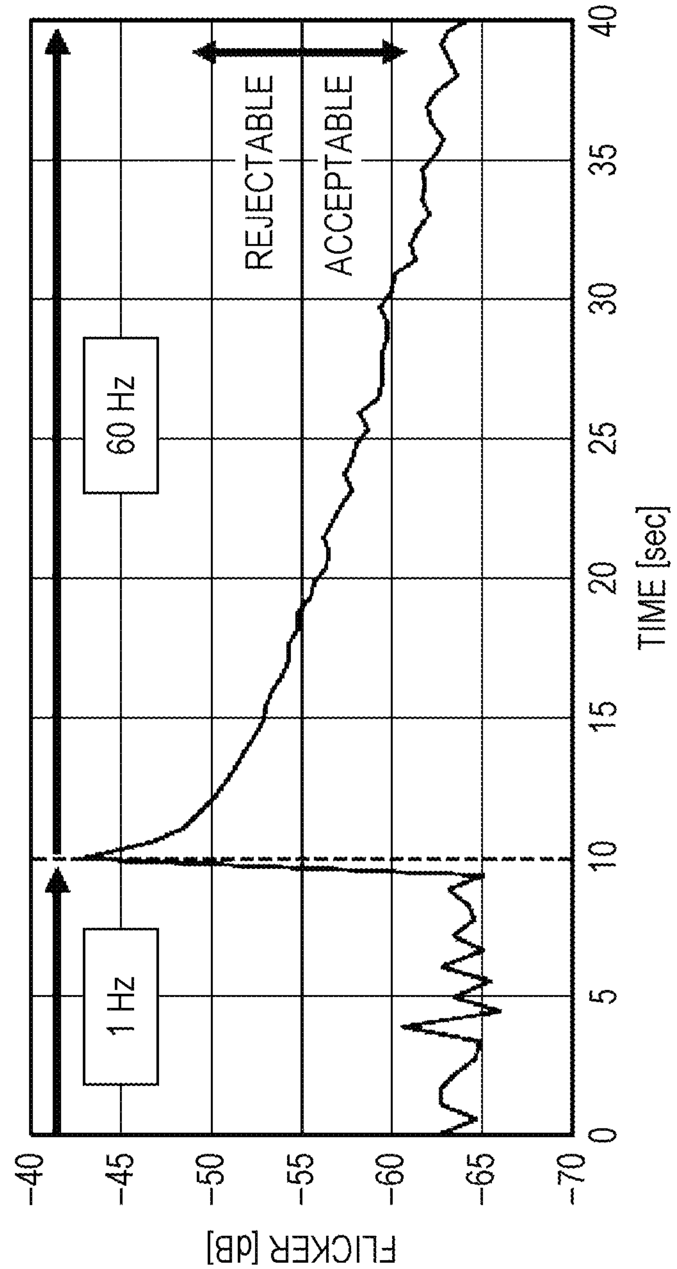
FIG. 11 illustrates measurement results of the flicker rate on a display apparatus serving as a comparative example.
Figure 12:
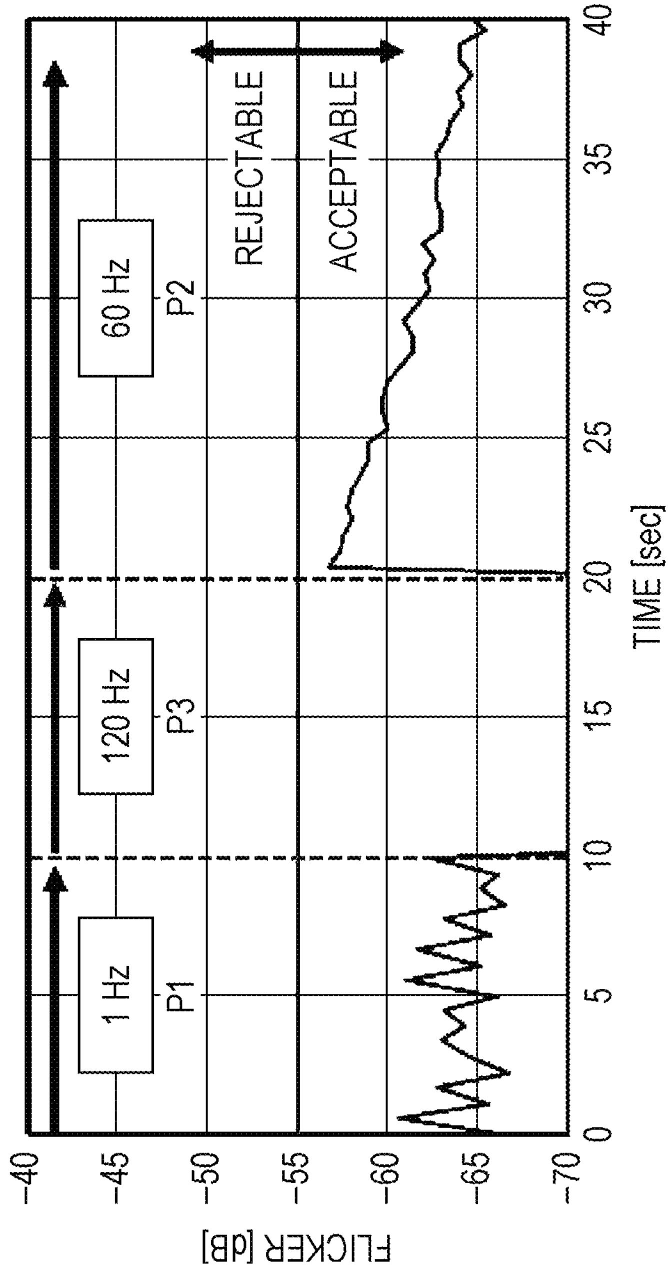
FIG. 12 illustrates measurement results of the display apparatus of the embodiment.

Comparison Results of Display Apparatus of Embodiment and Display Apparatus as Comparative Example Referring to FIGS. 11 and 12, comparison results of the display apparatus 100 as an example of the embodiment and a display apparatus as a comparative example are described below. FIG. 11 illustrates measurement results of the flicker rate on the display apparatus as the comparative example. FIG. 12 illustrates measurement results of the flicker rate of the display apparatus as the example of the embodiment.

Luminance meter CA-410 manufactured by Konica Minolta, Inc. may be used as a measuring device of the flicker rate. The flicker rates illustrated in FIGS. 11 and 12 are measured according to "Japan Electronics and Information Technology Industries Association (JEITA) Method of Flicker Measurement" described (Sep. 1, 2018) in "Technical Data Version 2" on luminance meter CA-410 manufactured by Konica Minolta, Inc.

Referring to FIG. 11, the measurement results of the display apparatus as the comparative example indicate the flicker rate that is measured from 10 seconds before the transition of the refresh rate from 1 Hz to 60 Hz until 30 seconds after the transition. Referring to FIG. 12, the measurement results of the display apparatus 100 as the example of the disclosure indicate the flicker rate that is measured throughout the first time period P1 with a refresh rate R1 of 1 Hz, the second time period P2 with a refresh rate R2 of 60 Hz and the third time period P3 that is between the first time period P1 and the second time period P2 and has a refresh rate R3 of 120 Hz. A criterion of the flicker rate that human is able to recognized is set to −55 dB. The flicker rate lower than or equal to −55 dB is judged to be acceptable (marked "ACCEPTABLE" in FIGS. 11 and 12) and the flicker rate higher than −55 dB is judged to be rejectable (marked "REJECTABLE" in FIGS. 11 and 12).

The display apparatus as the comparative example has a flicker rate exceeding −55 dB for 9 seconds after the transition of the refresh rate to 60 Hz as illustrated in FIG. 11 and is thus judged to be rejectable. The display apparatus as the example has a flicker rate lower than or equal to −55 dB throughout each of the first time period P1, the second time period P2 and the third time period P3 as illustrated in FIG. 12 and is thus judged to be acceptable. According to the example, it has been found that the flicker visibility may thus be controlled when the refresh rate transitions from 1 Hz to 60 Hz.

Modifications

The embodiment of the disclosure has been described for exemplary purposes only. The disclosure is not limited to the embodiment and the embodiment may be modified without departing from the scope of the disclosure. Modifications of the embodiment are described below.

(1) In the exemplary embodiment, for example, the refresh rate R1 is 10 Hz or lower, the refresh rate R2 is 20 Hz or higher and 90 Hz or lower, the refresh rate R3 is 60 Hz or higher and 240 Hz or lower and the length T3 of the third time period P3 is 18 seconds or longer and 22 seconds or shorter. The disclosure is not limited to these settings. The refresh rate R1 may be higher than 10 Hz. The refresh rate R2 may be lower than 20 Hz or higher than 90 Hz. The refresh rate R3 may be lower than 60 Hz or higher than 240 Hz as long as the refresh rate R3 is higher in frequency than the refresh rate R2. The length T3 of the third time period P3 may be shorter than 18 seconds or longer than 22 seconds.

(2) According to the embodiment, the system control circuit and the display control circuit are configured as separate circuits. The disclosure is not limited to this configuration. Specifically, the system control circuit and the display control circuit may be configured as a unitary circuit (integrated circuit).

(3) According to the embodiment, the polarity of the pixel voltage Vp may be alternated between a positive polarity and a negative polarity every frame during the first time period P1 and the second time period P2. The disclosure is not limited to this arrangement. The pixel voltage Vp of the same polarity may be supplied during the first time period P1 and the pixel voltage Vp of the same polarity may be supplied in a portion of the second time period P2.

(4) According to the embodiment, the source signal supplied to the odd-numbered source line is in reverse polarity to the source signal supplied to the even-numbered source line. The disclosure is not limited to this arrangement. The source signal of the same polarity is supplied to all the source lines.

The display apparatus may be configured as described below.

According to a first configuration, there is a provided a display apparatus including: a display panel displaying an image and including a pixel electrode and a common electrode that forms a electric field between the pixel electrode and the common electrode; a driving circuit that supplies the pixel electrode with a pixel voltage; and a control circuit that controls a refresh rate that is a frequency at which the driving circuit supplies the pixel electrode with the pixel voltage and at which the image to be displayed on the display panel is rewritten, wherein the control circuit, when changing the refresh rate from a first frequency to a second frequency higher than the first frequency, sets a third time period between a first time period used to rewrite at the first frequency the image to be displayed on the display panel and a second time period used to rewrite at the second frequency the image to be displayed on the display panel and rewrites the image on the display panel by alternately supplying at a third frequency for the third time period the pixel electrode with the pixel voltage having a positive polarity with respect to a common voltage supplied to the common electrode and the pixel voltage having a negative polarity with respect to the common voltage supplied to the common electrode, and wherein the third frequency is higher than the second frequency and is 60 Hz or higher if the second frequency is lower than 20 Hz (first configuration).

If the bias of charges created during the first time period still remains during the third time period, a difference occurs between an operation voltage resulting from refreshing with the positive polarity and an operation voltage resulting from refreshing with the negative polarity and a variation occurs in luminance at a frequency half as high as the third frequency. If the refresh rate is a frequency higher than or equal to 10 Hz, the flicker is less visible as the frequency is higher. When the first time period with a lower refresh rate transitions to the second time period with a higher refresh rate in the first configuration, the refresh rate of the third time period may be set to be higher than the refresh rate of the second time period. Since the frequency half as high as the third frequency is higher than a frequency (10 Hz or higher) half as high as the second frequency in this way, the flicker visibility may be controlled even when the bias of charges remains in the display panel during the third time period. Since the polarity of the pixel voltage is reversed at a higher frequency for the third time period, the bias of charges may be reduced in the display panel during the third time period. As a result, the flicker visibility may be controlled during the second time period subsequent to the third time period.

According to the first configuration, the third frequency may be higher than 60 Hz and 240 Hz or lower (second configuration).

If the frequency of the variation in luminance is higher than 10 Hz but 30 Hz or lower, the flicker may be visible to human. As the refresh rate is higher, the power consumption of the display apparatus increases. Since the frequency half as high as the third frequency is higher than 30 Hz in the second configuration, the flicker may be less visible. Since the third frequency is 240 Hz or lower, the power consumption may be reduced. The flicker visibility may be controlled with the power consumption reduced.

According to the second configuration, the third frequency is higher than 120 Hz or higher and 240 Hz or lower (third configuration).

If the frequency of the variation in luminance is 60 Hz or higher, the flicker may be almost invisible to human. According to the third configuration, the flicker visibility may be reliably controlled with the power consumption reduced.

According to one of the first through third configurations, the first frequency may be 1 Hz or higher and lower than 60 Hz. The second frequency may be 60 Hz or higher. The length of the third time period may be 18 seconds or longer and 22 seconds or shorter (fourth configuration).

According to the fourth configuration, if the first frequency is 1 Hz or higher and lower than 60 Hz, the second frequency is 60 Hz or higher and the length of the third time period is 18 seconds or longer and 22 seconds or shorter, the bias of charges may be sufficiently reduced in the display panel during the third time period.

The present disclosure contains subject matter related to that disclosed in Japanese Priority Patent Application JP 2023-129511 filed in the Japan Patent Office on Aug. 8, 2023, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display apparatus comprising:

a display panel displaying an image and including a pixel electrode and a common electrode that forms an electric field between the pixel electrode and the common electrode;

a driving circuit that supplies the pixel electrode with a pixel voltage; and a control circuit that controls a refresh rate that is a frequency at which the driving circuit supplies the pixel electrode with the pixel voltage and at which the image to be displayed on the display panel is rewritten, wherein the control circuit, when changing the refresh rate from a first frequency that is 1 Hz or higher and lower than 60 Hz to a second frequency that is 60 Hz or higher, sets a third time period between a first time period that is used to rewrite, at the first frequency, the image to be displayed on the display panel and a second time period that is used to rewrite, at the second frequency, the image to be displayed on the display panel, and rewrites the image on the display panel by alternately supplying, at a third frequency for the third time period, the pixel electrode with the pixel voltage having a positive polarity with respect to a common voltage supplied to the common electrode, and the pixel voltage having a negative polarity with respect to the common voltage supplied to the common electrode, the third frequency is a constant value that is higher than the second frequency, and the third time period is 18 seconds or longer and 22 seconds or shorter.

2. The display apparatus according to claim 1, wherein the third frequency is higher than 60 Hz and 240 Hz or lower.

3. The display apparatus according to claim 2, wherein the third frequency is 120 Hz or higher and 240 Hz or lower.

* * * * *